United States Patent [19]

Politycki et al.

[11] 3,767,538

[45] Oct. 23, 1973

[54] METHOD OF COATING PLASTIC FILMS WITH METAL

[75] Inventors: Alfred Politycki, Ottobrunn; Wolfgang Stoeger, Planegg, both of Germany

[73] Assignee: Seimens Aktiengesellschaft, Berlin and Munich, Germany

[22] Filed: Jan. 6, 1972

[21] Appl. No.: 215,932

[30] Foreign Application Priority Data

Jan. 11, 1971 Germany .................. P 21 01 049.1

Jan. 28, 1971 Germany .................. P 21 04 058.4

[52] U.S. Cl. ............... 204/30, 204/32 R, 204/38 B, 204/52 R, 117/47 A

[51] Int. Cl. ........................... C23c 3/00, C23f 17/00

[58] Field of Search .................. 204/32 R, 32 S, 30, 204/38 B, 20, 52 R; 117/47 A

[56] References Cited

UNITED STATES PATENTS 3,616,296 10/1971 Hangelar et al. .................... 204/30

OTHER PUBLICATIONS

The Electrochemical Soc., Preprint 88–95, released 10–8–45, pgs. 35–39. Published Transactions ECS Vol. 88, 1945 pgs. 377–381.

*Primary Examiner*—John H. Mack
*Assistant Examiner*—R. L. Andrews
*Attorney*—Carlton Hill et al.

[57] ABSTRACT

A method of coating a polyester or polyimide film with a metal whereby the film surfaces to be coated are at first cleansed, degreased and roughened, as by the use of chemical agents and are then heated at temperatures of about 60° to 150° C. for a period of time sufficient to expel any water that may be present. The film is then dipped into a solution containing palladium ions so that seed crystals thereof form on the film surfaces to be coated. Thereafter, an electrically conductive, water-vapor permeable continuous layer of silver is produced onto the palladium-containing film surfaces and the silver-coated film is then heated at temperatures of about 60° to 150° C. for a period of time sufficient to expel any water that may be present. Then a reinforcing metal layer, as of copper, is galvanically produced onto the silver layer and the so-coated film is usable, for example in the manufacture of electronic circuit assemblies.

8 Claims, No Drawings

METHOD OF COATING PLASTIC FILMS WITH METAL

BACKGROUND OF THE INVENTION

1. Field of the Invention

The invention relates to methods of coating plastic films with metal and more particularly with methods of coating polyester and polyimide films with firmly adhering etchable metal layers for use in manufacture of finely detailed conductor paths.

2. Prior Art

Certain present-day electronic assemblies require extremely detailed conductor paths on one or both surfaces on a dielectric substrate or film, with feed throughs between such surfaces. Preferred films for such applications are polyester (polyethylene terephthalate or polyterephthalate acid ester), such as available under the registered trademark "MYLAR" and polyimide films, such as available under the registered trademark "KAPTON." It is known to utilize such plastic films with a copper cladding, i.e., the film is coated on one or both sides with a copper foil.

Certain of such copper foils are applied with an adhesive between the substrate and the foil. However, the adhesive interfers with proper production of necessary through-holes, since it is removable only with materials that attack and/or destroy the metal cladding. Since the adhesive must be removed for through-hole production, prior art has utilized mechanical processes, i.e., boring, to produce the desired through holes. Mechanical processes do not lend themselves to the economical production of large numbers of through-holes or bores. Other copper foils are applied directly to the film surfaces, however, they have insufficient adhesion to the film to be able to withstand through-hole production and generally such metal foils easily detach from the film surfaces. In an attempt to overcome this drawback, the conductor paths were attached to the substrate at the through-hole areas and in other suitable areas by mechanical anchoring means. However, this is uneconomical and does not eliminate the separation problem.

SUMMARY OF THE INVENTION

The invention provides an improved method of coating plastic films with a tightly adhering layer of metal on one or both sides thereof that substantially eliminates the prior art drawbacks. The metal layers coated in accordance with the principles of the invention are readily etchable to provide detailed conductor paths and are suited for economical production of desired through-holes, as by chemical photo-lithographic processes.

In accordance with the principles of the invention, select surfaces of a plastic film which are to be coated with a metal are cleansed, degreased and roughened, preferably by treatment with a chemical agent although physical agents are also usable. The film is then heated at temperatures of about 60° to 150°C. for several hours to expel any water that may be present. The selected surface areas are then coated with a solution containing palladium so that small amounts or seed crystals of palladium are deposited on such surfaces and act as nucleating sites for later deposition of a continuous film of metal. Then a relatively thin continuous layer of silver is applied, as by chemical deposition onto the surfaces containing the nucleating sites. The thickness of the silver layer is regulated so as to be of a thickness sufficient for electrical conductivity but permeable to water vapors and the like. The silver-coated film is then heated at temperatures of about 60° to 150°C. for several hours to expel any water that may be present and to improve the adhesion between the plastic film and the silver. A reinforcing metal layer, as of copper, is then galvanically applied onto the silver layer and the so-coated film is ready for use, for example, in the manufacture of detailed electronic circuit assemblies, as by chemical photo-lithographic processes.

DESCRIPTION OF THE PREFERRED EMBODIMENTS

The invention comprises coating plastic film surfaces with tightly adhering layers of metal. The metal layers applied in accordance with the invention are readily etchable to provide detailed conductor paths and no difficulties are encountered in the economic production of through-holes in such layers, as by chemical processes such as a photo-lithographic process.

The plastic film utilized as a substrate is composed of a material selected from the group consisting of polyester (polyethylene terephthalate) resins and polyimide resins. Suitable film materials of such composition are available under the registered trademarks "MYLAR" and "KAPTON" respectively, and other similar film materials are also utilizable. The substrate or film must have good dielectric characteristics because it is desired to use the film clad with metal layers in accordance with the invention in the manufacture of electronic assemblies.

Such electronic assemblies include conductor paths and nonencapsulated semiconductor chips for electrical circuits or the like on a film or board. Known photolithographic processes allow the production of extremely detailed or fine structures in such electronic assemblies. Preferably, the electronic assemblies have two-layer wirings and the structures of the conductor paths are produced by etching the metal layer on both sides of a substrate.

The invention includes a number of sequential steps that finally produce a sufficiently solidly adhering metal coating on a plastic film by means of only bonding forces between the plastic film and the metal and without the use of adhesives.

In carrying out the invention, it is advantageous to mount the film or a select surface thereof on a suitable frame so that it may be conveniently manipulated.

The selected surfaces of a film that are to be coated are at first cleansed, degreased and activated or roughened. In certain embodiments, roughening is accomplished by chemical treatment, such as by contacting the desired film surface with a fresh sulfuric acid-hydrochloric acid mixture. Generally concentrated acids are utilized, preferably in a ratio ranging from about 9:1 to about 7:1 ($H_2SO_4$:$HCl$). This mixture of acids produces free hydrogen chloride gas that at least initiates the activation process, especially on polyimide films.

In a preferred embodiment, an amount of stannous chloride is added to the acid mixture. Preferably, the acid mixture contains amounts of stannous chloride ranging from about 0.1 to about 1 gram for each liter of acid mixture utilized. The presence of stannous ions, a reduction agent, appears to increase the sensitization of the film surfaces.

In an alternative embodiment, the roughening of the select film surfaces is accomplished by the mechanical treatment, such as by impinging jets of sand against the surfaces to be coated. If desired, chemical and mechanical roughening may be combined in a single process.

In certain embodiments of the invention the film surfaces are chemically changed after roughening, by treatment with a base so as to improve the adhesive characteristics thereof. Polyimide films are particularly susceptible to this chemical change. Of course, when an activated film surface is to be chemically changed, it must first be well flushed with water or the like to remove the acid mixture. The preferred base for this use is caustic soda (sodium hydroxide) having a concentration ranging from about 10 percent to about 50 percent and preferably being about 20 percent. A treatment with the base is preferably carried out at temperatures ranging from about 50° to 70° C. which is conveniently accomplished by heating the base solution.

After the select film surfaces have been roughened (and in certain instances chemically changed), they are flushed with water and then heated in a vacuum at temperatures ranging from about 60° to 150° C. for several hours so as to expel any water that may have been absorbed. Preferably, the heating is continued for about 10 to 15 hours to insure that all water has been expelled and to shrink or tighten the film surfaces within the mounting frame. In situations where a polyimide film is being treated, any polyamido acids that remain undisassociated at these temperatures are converted into polyimides during the heating step. Further, the heating step materially increases the strength of the adhesion between the substrate and the later applied metal layer. A preferred temperature for heating polyimide films is about 130° C., while a preferred temperature for heating polyethylene terephthalate films is about 100° C.

The select surfaces of the film that are to be coated are then provided with seed crystals of palladium. Preferably this is accomplished by wetting such surfaces with a solution containing palladium ions therein. A preferred solution contains a select amount of palladium chloride therein, preferably about 0.1 to 1.0 percent.

In certain embodiments, the selected surfaces of the film are first wetted with a reducing solution, preferably containing stannous ions such as accomplished by placing a select amount of stannous chloride in a solution to insure the sensitization of such surfaces. Substantially simultaneously therewith or thereafter such sensitized surfaces are provided with palladium nucleation sites, preferably by wetting such surfaces with the above noted palladium solution. In embodiments where the activated surfaces are simultaneously contacted by a reducing solution and a palladium solution, a single solution is provided with stannous and palladium ions.

Contact between the film surfaces and the palladium solution (with or without the stannous solution) is maintained for a period of time sufficient to form seed crystals of palladium onto the select surfaces. The amount of palladium thus deposited on the film surfaces is insufficient for electrical conduction.

The film surfaces having metallic nucleating sites incorporated therein are then coated with a relatively thin continuous layer of silver. The silver layer is preferably applied by chemical processes, however, evaporation, cathode sputtering or pyrolytic decompositions of suitable silver compounds is also utilizable in providing the desired silver layer. Chemical application of a silver layer is conventionally accomplished by contacting the surfaces to be coated with a silver solution so that a silver layer is precipitated from such solution. A number of suitable silver solutions are commercially available for such purposes.

The thickness of the silver layer is carefully regulated so as to be relatively thin, ranging from about 30 to 300 nm (nano-meters). Such a silver layer is electrically conductive for subsequent galvanic processes but is water-vapor permeable so as to avoid partial separations from the film surfaces or vapor-bubble formation during subsequent heating steps.

The silver-coated film surfaces are then heated to remove any water therefrom and to improve the adhesion between the silver and the substrate surfaces. Preferably, the heating process takes place relatively quickly after the silver layer has been applied. The heating process preferable takes place in a vacuum at temperatures ranging from about 50° C. to 150° C. for a period of time sufficient to remove any water from the film and generally ranging from about 10 to 15 hours. It is important that the silver layer, particularly a two-sided silver layer sandwiching a film therebetween, be relatively thin so that any water-vapor or the like can readily penetrate the silver layer and escape. If the silver layer is too thick, the layer may be separated from the film by vapor-bubble formation.

In case the silver layer is deposited by a dry technique such as evaporation, cathode sputtering, etc., it is possible to save this heating step. However, even in such cases, it is preferable to utilize the heating step since it improves the adhesion between the silver and the substrate.

After the heating step, the silver layer is reinforced by galvanically depositing a metal layer thereon, such as copper. It is preferable to proceed with the reinforcing step as soon as possible since the film may have a tendency to absorb moisture from the air.

Since the silver layer has very good electrical conductivity, a relatively high current can be utilized with the galvanic bath and it is preferable to utilize as high a current as possible. However, care must be taken to avoid heating the silver layer to any noticeable degree. The use of a high current allows the silver layer to be plated extremely fast with a relatively dense copper layer and thus prevent water absorption by the film. The current is initially relatively low and is increased in stages or continuously with the increased conductivity of the metal layer being formed on the film until an optimum value for the plating current strength is obtained.

The metal coated film is now ready for etching and/or production of the desired through-holes by photolithographic techniques. The metal layers have good adhesion to the film surfaces and do not separate or lift off during etching or subsequent heating (such as soldering) operations.

The invention utilizes a number of individual steps that finally provide a sufficiently solid adherence between the metal coating and the film surfaces by only natural bonding forces. Copper does not form very strong bonds with plastic and it would be expected that silver should form even weaker bonds than copper with plastic films. Accordingly, it is surprising to discover that silver is capable of forming such strong bonds with plastic films. The invention is particularly useful for coating polyimide films with metal layers.

It will be understood that modifications and variations may be effected without departing from the spirit and scope of the novel concepts of the present invention.

We claim as our invention:

1. A method of coating a plastic film composed of a material selected from the group consisting of polyethylene terephthalate resin and polyimide resin with an etchable metal layer consisting of the sequential steps of: (1) cleaning, degreasing and roughening the surface areas of said film to be coated with said metal layer, (2) heating the roughened film at temperatures in the range of about 60° to 150° C. for a period of time sufficient to expel any water in said film; (3) providing seed crystals of palladium onto said surface areas; (4) coating a continuous electrically conductive water-vapor permeable layer of silver onto said surface areas; (5) heating the silver-coated film at temperatures in the range of about 60° to 150° C. for a period of time sufficient to expel any water in said film; and (6) galvanically depositing a reinforcing layer of metal onto said silver layer.

2. A method as defined in claim 1 wherein step (3) comprises wetting the surface to be coated with a solution containing palladium and stannous ions.

3. A method as defined in claim 1 wherein the plastic film is composed of polyimide resin and is heated at steps (2) and (5) at temperatures of about 130° C.

4. A method as defined in claim 1 wherein the plastic film is composed of polyethylene terephthalate resin and is heated at steps (2) and (5) at temperatures of about 100° C.

5. A method as defined in claim 1 wherein step (6) is performed relatively quickly after step (5).

6. A method as defined in claim 1 wherein step (6) comprises initially applying a relatively low electric current until a sufficiently conductive layer is formed and then increasing the current to the optimum value for galvanic deposition.

7. A method of coating select surfaces of a polyimide film with a metal layer consisting of the sequential steps of: (1) cleaning, degreasing and roughening said select surfaces with a mixture of concentrated hydrosulfuric acid and concentrated hydrochloric acid, the ratio of said acids in said mixture ranging from about 9:1 to about 7:1 respectively; (2) heating the roughened film in vacuum at temperatures of about 60° to 150° C. for about 10 to 15 hours; (3) wetting said select surfaces with a solution containing about 0.1 percent to about 1 percent palladium chloride for a period of time sufficient to form seed crystals of palladium onto said select surfaces; (4) chemically producing a continuous layer of silver onto said select surfaces in a thickness ranging from about 30 to about 300 nano meters; (5) heating the silver coated film in a vacuum at temperatures of about 60° to 150° C. for about 10 to 15 hours; and (6) galvanically depositing a layer of copper onto said silver layer.

8. A method of coating select surfaces of a polyimide film with a metal layer consisting of the sequential steps of: (1) cleaning, degreasing and roughening said select surfaces with a mixture of concentrated hydrosulfuric acid and concentrated hydrochloric acid, the ratio of said acids in said mixture ranging from about 9:1 to about 7:1 respectively, said mixture including about 0.1 to about 1 gram of stannous chloride for each liter of acid mixture; (2) flushing said select surfaces with water and contacting said surfaces with a caustic soda solution having a concentration of about 10 percent to 50 percent and a temperature ranging from about 50° to 70 ° C.; (3) flushing said select surfaces with water and heating the roughened film in vacuum at temperatures of about 60° to 150° C. for about 10 to 15 hours; (4) wetting said select surfaces with a solution containing stannous chloride and with a solution containing palladium chloride so that seed crystals of palladium form on said select surfaces; (5) chemically producing a continuous layer of silver onto said select surfaces in a thickness ranging from about 30 to about 300 nano meters; (6) heating the silver-coated film in a vacuum at temperatures of about 60° to 150° for about 10 to 15 hours; and (7) galvanically depositing a layer of copper onto said silver layer.

* * * * *